United States Patent [19]

Koch et al.

[11] Patent Number: 5,578,683
[45] Date of Patent: Nov. 26, 1996

[54] CROSSLINKABLE GRAFT PRESSURE-SENSITIVE ADHESIVES

[75] Inventors: Carol A. Koch, San Gabriel; Prakash Mallya, Pasadena, both of Calif.; Colin C. Smith, Mill Hall, Pa.

[73] Assignee: Avery Dennison Corporation, Pasadena, Calif.

[21] Appl. No.: 266,972

[22] Filed: Jun. 27, 1994

[51] Int. Cl.⁶ ............... C08F 265/04; C08F 220/06
[52] U.S. Cl. ............... 525/301; 525/309; 525/286; 526/273; 526/318.44; 526/328.5
[58] Field of Search ............... 525/301, 309, 525/286; 526/273, 318.44, 328.5

[56] References Cited

U.S. PATENT DOCUMENTS

| | | | |
|---|---|---|---|
| 3,786,116 | 1/1974 | Milkovich | 260/885 |
| 4,994,322 | 2/1991 | Delgado | 428/343 |
| 5,006,582 | 4/1991 | Mancinelli | 524/271 |
| 5,011,867 | 4/1991 | Mallya | 522/109 |

*Primary Examiner*—Vasu S. Jagannathan
*Attorney, Agent, or Firm*—Christie, Parker & Hale, LLP

[57] ABSTRACT

There is provided a pressure-sensitive adhesive graft copolymer formed of an acrylic backbone comprising at least one alkyl acrylate ester containing from about 4 to about 8 carbon atoms in the alkyl group having pendant therefrom side chains having a molecular weight of from about 1,000 to about 25,000, a glass transition temperature of greater than about 25° C. and having crosslinkable reactive moieties.

37 Claims, 3 Drawing Sheets

CROSSLINKABLE GRAFT PRESSURE-SENSITIVE ADHESIVES

FIELD OF THE INVENTION

This invention relates to pressure-sensitive adhesive graft copolymers that exhibit high temperature performance in consequence of crosslinked grafts of a high glass transition temperature macromonomer to an acrylic polymer backbone.

BACKGROUND OF THE INVENTION

The use of macromonomers with pressure-sensitive adhesives (PSA) and for other applications is known. Macromonomers are relatively low molecular weight polymers having a copolymerizable vinyl functional reactive group at one end of the polymer which is capable of copolymerizing with an acrylate group.

U.S. Pat. No. 3,786,116 discloses an anionic polymerization technique used to make macromonomers of styrene, substituted styrenes, butadiene and isoprene. Graft copolymers of poly-alphamethylstyrene and polystyrene with comonomers such as butylacrylate are exemplified. The role of the hard or high glass transition temperature (Tg) macromonomers is to improve the cohesive strength of the network through association of the hard segments. Synthesis of a graft copolymer of polypropylene with a polyisoprene macromonomer by coordination polymerization is also illustrated. The role of the polyisoprene is to modify the impact properties of the hard polypropylene. Use of crosslinkable macromonomers is not taught or suggested.

U.S. Pat. No. 4,551,388 uses a hard poly(vinyl aromatic) macromonomer in an acrylic PSA composition. The role of the macromonomer is to provide cohesive strength to the network through the association of hard domains. U.S. Pat. No. 4,656,213 extends the '388 patent by using tackifiers and optionally a plasticizer for the acrylic phase.

U.S. Pat. No. 4,554,324 deals with a tacky PSA containing a macromonomer having a Tg greater than 20° C. The role of this macromonomer in the PSA is to improve the cohesive strength through the high Tg macromonomer domains. The macromonomers of the '324 patent are non-reactive except for the ability to copolymerize with an acrylate.

U.S. Pat. No. 4,693,935 pertains to combining polysiloxane macromonomers with acrylic comonomers to obtain a PSA with reduced adhesion to surfaces. The adhesives are repositionable adhesives.

U.S. Pat. No. 4,732,808 deals with an acrylic skin adhesive containing a high Tg macromonomer. The role of the macromonomer is to improve cohesive strength.

U.S. Pat. No. 4,833,179 discloses the use of a high Tg macromonomer as a modifier to increase the storage stability of suspension polymer microspheres.

U.S. Pat. No. 4,851,278 discloses acrylic polymers synthesized with high Tg macromonomers which are then used as binders to reduce the transfer of tacky microspheres. The improvement in cohesive strength comes from hard polystyrene domains.

U.S. Pat. No. 5,006,582 discloses the use of hard macromonomers based on polymethyl methacrylate in combination with acrylic monomers and a tackifier for the acrylic phase. The resulting polymer is stated to have high shear properties.

U.S. Pat. No. 5,057,366 disclosed a PSA coated sheet material using the compositions of U.S. Pat. No. 4,454,324.

None of the above patents, all of which are incorporated by reference, contemplate the use of a low Tg acrylic polymer matrix that is formed in the presence of a reactive high Tg macromonomer to improve high temperature properties without adversely affecting the low Tg properties of the acrylic polymer matrix.

SUMMARY OF THE INVENTION

The present invention is directed to "comb-type" graft copolymers comprising an acrylic backbone containing at least one interpolymerized alkyl acrylate ester containing from about 4 to about 8 carbon atoms in the alkyl group and having pendant therefrom side chains which individually have a molecular weight of from about 1,000 to about 25,000, a glass transition greater than about 25° C. and providing crosslinkable moieties. They may be formed by polymerizing the alkyl acrylate monomer system to form the adhesive backbone in the presence of a crosslinkable high Tg reactive macromonomer, or by preforming the backbone and coupling the side chains to the backbone. The present preferred route is forming the backbone in the presence of the macromer. The preferred macromers have a terminal vinyl group and crosslinkable amino, epoxy, hydroxyl and/or carboxyl functionalities. The preferred glass transition temperature of the pendant side chains is in excess of about 50° C. In the pressure-sensitive adhesives, the comb-type graft copolymer is believed to have a continuous phase of the acrylic polymer backbone with pendant side chains of high glass transition temperature reactive macromonomer copolymer which form a discontinuous phase.

Graft polymerization can be carried out using solution, suspension or emulsion polymerization techniques.

The acrylic polymer backbone is preferably formed of from 35% to 100% by weight of the total acrylate monomers of one or more alkyl acrylates containing from about 4 to about 8 carbon atoms in the alkyl group. The preferred alkyl acrylates are 2-ethylhexyl acrylate, isooctyl acrylate and butyl acrylate. The acrylic polymer may be polymerized in the presence of a vinyl ester such as vinyl acetate, one or more diesters of a dicarboxylic acid present in a total amount of up to about 35 percent by weight based on the total weight of the acrylate monomers, and unsaturated carboxylic acids containing from 3 to about 5 carbon atoms present in the amount up to about 15 percent by weight of the acrylate monomers.

The presently preferred acrylic backbone polymer is a copolymer of 2-ethylhexyl acrylate present in the amount from about 95 to about 90 percent by weight and acrylic acid present in the amount of from about 5 to about 10 percent by weight based on the weight of acrylic monomers, said polymer being polymerized in the presence of a free radical catalyst.

The high Tg reactive macromonomers employed for grafting to the acrylic backbone are preferably present in an amount of from about 1 to about 15 percent by weight of the monomers forming the acrylic backbone and the macromonomer. The tack of the formed graft copolymer may be modified by an acrylic phase modifying additive which is a tackifier, plasticizer and/or oil which is soluble in the acrylic phase. The modifying additive, if employed, is normally present in the concentration ranging from about 5 percent to about 40 percent by weight based on the weight of the acrylic phase and modifying additive.

On coating, the polymer phases segregate to form a continuous low Tg acrylic phase to which there is grafted the high Tg side chains or macromonomer. On crosslinking of the domains, the network becomes thermoset.

The pendant groups may be crosslinked chemically such as by use of an epoxy crosslinking agent, or ionically, or thermally or by use of actinic or electron beam radiation.

The pressure-sensitive adhesive graft copolymers of the instant invention provide outstanding adhesion and good elevated temperature properties which is believed caused by the independence of acrylic polymer continuous phase from the grafted macromonomer discontinuous phase which provide excellent elevated temperature properties.

DETAILED DESCRIPTION OF THE DRAWINGS

Figure 1:
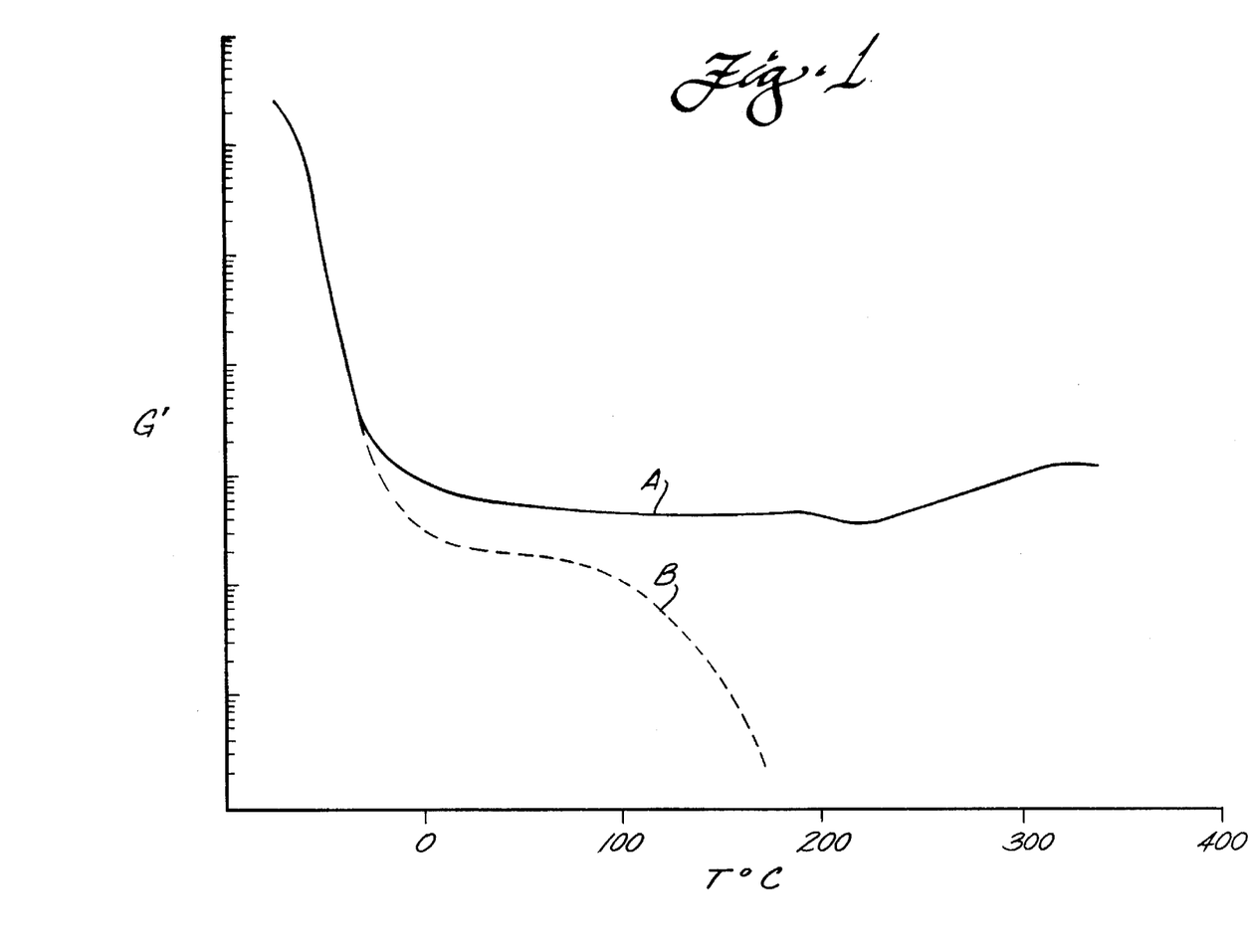
FIGS. 1 to 3 are Rheometrics curves of crosslinked and uncrosslinked two phase graft copolymers. All are plots of the log of modulus (G') vs. temperature in °C.

FIG. 1 is presented to establish the first evidence of discontinuous phase crosslinking. Polymer A is a graft copolymer of an acrylic polymer backbone of poly 2-ethyl hexyl acrylate polymerized in the presence of a macromonomer of methylmethacrylate (MMA) and glycidyl methacrylate (GMA). The MMA/GMA macromonomers were then crosslinked using an epoxy crosslinking agent. The presence of a plateau shows crosslinking. The plateau extends beyond 200° C. indicating excellent elevated temperature performance.

Polymer B employs the same acrylic backbone but only a MMA macromonomer. The MMA domains are not crosslinkable and at about 100° C. the domain softens and the modulus G' drops dramatically indicating Polymer B would have poor elevated temperature properties as compared to Polymer A.

Figure 2:
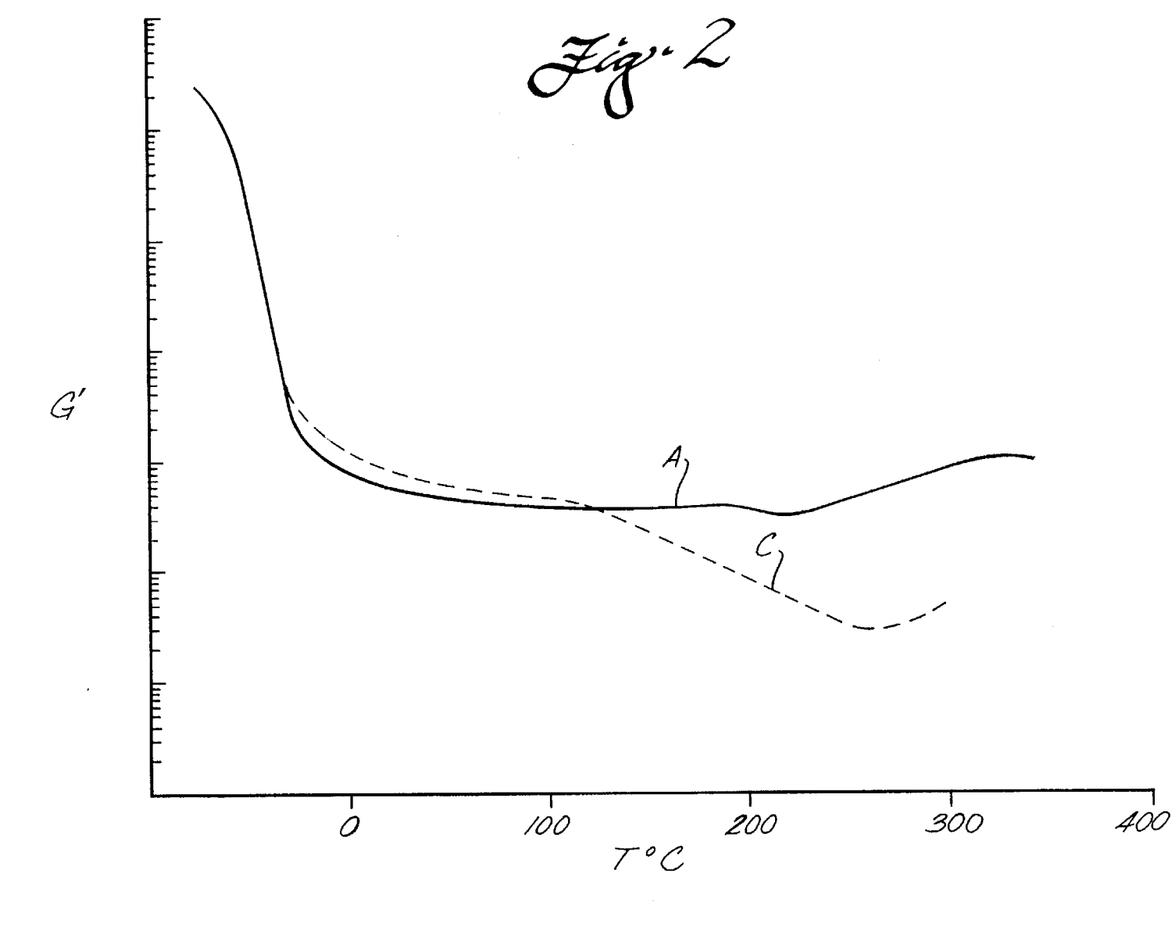

In FIG. 2 Polymer A is the same as that shown in FIG. 1.

Polymer C employs the same acrylic backbone and MMA/GMA macromonomer but without the epoxy crosslinker. The low temperature modulus curve of crosslinked Polymer A is the same as uncrosslinked Polymer C. In the plot of modulus against temperature, the low temperature descending portion of the curve is indicative of the state of the continuous phase backbone. Since the descending portion of the curves for Polymer A and Polymer C coincide, there was no crosslinking of the backbone and crosslinking only took place in the graft MMA/GMA macronomers. The upward shift in the modulus of Polymer C at approximately 250° C. indicates GMA was thermally crosslinked even in the absence of the epoxy crosslinker.

Figure 3:
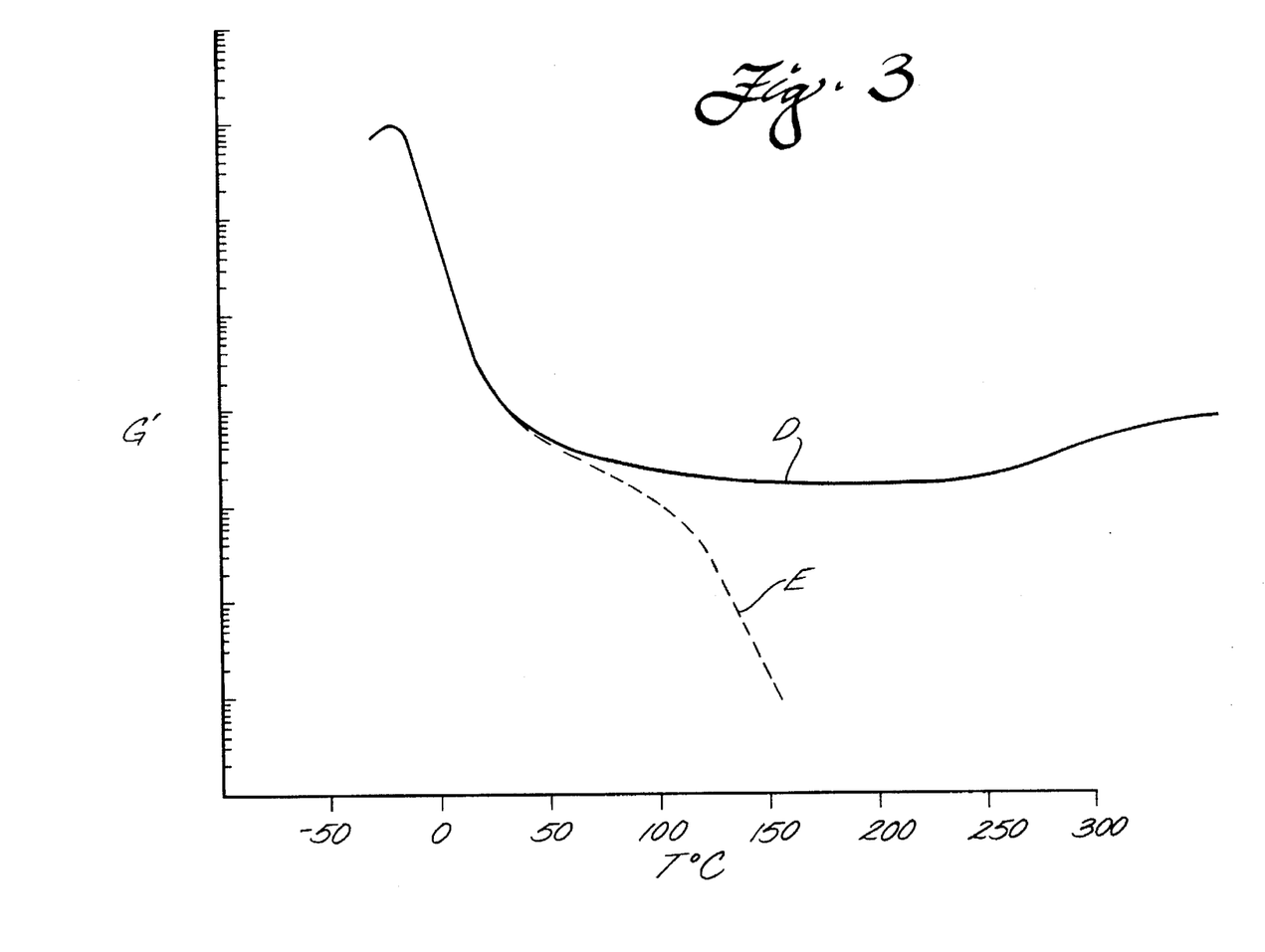

FIG. 3 is to demonstrate the effect of Foral 105 tackifier on the crosslinked polymers of the invention in comparison to one where GMA is absent. Polymer D is a graft copolymer having pendant MMA/GMA macromonomer groups plus 40% by weight Foral 105 tackifier and crosslinked using an epoxy crosslinking agent. The log of plateau modulus (G') vs. temperature establishes that even at a high tackifier level no flow is seen even above 300° C. indicating excellent high temperature performance.

For Polymer E, the GMA is eliminated from the macromonomer grafts but the same amount of acrylic polymer and Foral 105 tackifier were employed. The plateau is not as well defined and above 100° C. severe flow occurs which is a measure of poor elevated temperature performance.

DETAILED DESCRIPTION

The pressure-sensitive adhesives of the instant invention are graft copolymers of a continuous phase acrylic backbone polymer having pendant therefrom side chains which individually have a molecular weight of from about 1,000 to about 25,000, a glass transition temperature (Tg) greater than about 20° C. and at least one crosslinkable moiety.

The pressure-sensitive adhesives are preferably made by copolymerizing an acrylate ester monomer system in the presence of one or more reactive crosslinkable macromonomers preferably having epoxy, hydroxy or carboxyl functional groups and also preferably a glass transition temperature greater than about 50° C. Alternately the acrylic backbone can be preformed and the pendant groups coupled to the back such as by reaction of a functional group with a internal or pendant anhydride group. In either event this leads to the formation of a comb type graft copolymer having an acrylic polymer backbone forming a continuous phase and grafted or coupled thereto of the high Tg crosslinkable side chains.

By the term "crosslinkable macromonomer" as used herein there is meant relatively low molecular weight, e.g., about 1,000 to about 25,000, copolymers containing a copolymerizable vinyl end group and crosslinkable moieties. Examples of macromers include copolymers of an alkyl methacrylate such as methyl methacrylate with a monomer providing a reactive amino, epoxy, hydroxyl and/or carboxyl groups and a terminal vinyl group end block, tapered or random copolymers of styrene with butadiene or isoprene which have been epoxidized and contain a terminal vinyl group and the like.

The domains are crosslinked through the addition of reactant polymer containing functional groups capable of reacting with the epoxy or hydroxyl groups. For example, polymethyl methacrylate containing hydroxyl or amino groups could be used. Also, the pendant groups could be crosslinked by adding catalysts such as cationic initiators which initiate ring opening polymerization of epoxy groups.

Other functional groups could be included in the macromonomer. For example, the MMA could be copolymerized with a photoinitiator such as acrylated hydroxyl group containing photoinitiator (ex. acrylate Darocur 2959). This could be crosslinked by subjecting the polymer to UV either alone or in the presence of small amounts of added comonomers. Other functional macromonomers such as polymethyl methacrylate/hydroxy ethyl acrylate (PMMA/HEA) or HEMA containing hydroxyl groups or polymethyl methacrylate/acrylic acid (PMMA/AA) or methacrylic acid (MAA) containing carboxylic acid groups could be used. These functional groups could be crosslinked by known means of crosslinking such functional groups.

Glycidylmethacrylate crosslinks even without a catalyst during drying. This leads to high elevated temperature properties of the dried PSA film. The process of crosslinking can be accelerated by the added catalyst such as Anchor 1170 made by Pacific Anchor corporation of Los Angeles. Over time, the GMA continues to crosslink within the domain until all epoxy groups are consumed.

The monomer mixture could be all acrylate esters or include polar comonomers such as vinyl pyrrolidone and/or acrylic acid. Other comonomers such as vinyl acetate, dioctyl fumarate or maleate, styrene and the like can be used to further modify the Tg and other properties of the acrylic based backbone. The graft copolymers of the invention when cast as a film, exhibit two phase morphology as demonstrated by solubility characteristics in selected solvents. The domains are sufficiently small so that they do not scatter light thus giving clear films.

While not bound by theory, the acrylic backbone is believed to be the continuous phase with the macromonomer domains as the discontinuous phase.

The low Tg acrylic continuous phase can be further modified using compatible tackifiers, plasticizers and/or oils. The continuous phase can also be crosslinked using the functional groups in the acrylic matrix i.e. ionic or other means of crosslinking such as with isocyanates and the like. Alternately, UV or electron beam (EB) energy can be used to post crosslink the PSA graft copolymer. The untackified and tackified graft copolymer has outstanding adhesion, good room and elevated shear properties and excellent aging.

Graft polymerization can be carried out by solution, suspension or emulsion polymerization techniques. If necessary, it can also be carried out by polymerization of the monomers and the macromonomer in the presence of a photoinitiator by exposing the mixture to UV radiation (on web polymerization).

As stated above, the present invention is based on pressure-sensitive adhesives (PSA) of a comb-type graft copolymers containing a low glass transition temperature (Tg) acrylic backbone having grafted thereto a high glass transition temperature, about 25° C. or preferably about 50° C. or more, crosslinkable macromonomer where the grafting reaction occurs at the vinyl terminal group and the crosslinking reaction occurs at amino, hydroxyl, carboxyl and/or epoxy groups of the macromonomer.

More particularly, the polymers of the instant invention preferably are made by polymerizing an acrylic ester-monomer system to form a polymer of low glass transition temperature in the presence of a macromonomer having a reactive vinyl terminal group and providing crosslinkable carboxyl, hydroxyl or epoxy functional groups. This leads to the formation of a comb-type graft copolymer having a low Tg acrylic-based backbone with side chains of a high glass transition temperature macromonomer.

Glass transition temperature of the polymer is determined by a differential scanning calorimeter (DSC) or dynamic mechanical analysis.

On coating, the polymers phase separate to form a continuous low Tg acrylic phase to which there is grafted a high Tg macromonomer. On crosslinking the high Tg macromonomer network becomes thermoset. In combination, the continuous phase provides outstanding adhesion while the crosslinked macromonomers provide excellent elevated temperature properties.

Graft polymers are preferably synthesized by free radical polymerization techniques in solution using solvents such as ethyl acetate, toluene and the like.

The acrylic monomer system used to make the acrylic backbone could be solely based on acrylate ester monomers, but may also be modified by inclusion of polar comonomers.

The acrylic-based backbone polymers to which the high Tg domain crosslinked macromonomer is grafted may contain, on a percent-by-weight basis, from about 35 to about 100 percent by weight of the total acrylate backbone of one or more alkyl acrylate esters containing about 4 to about 8 carbon atoms in the alkyl group. Useful alkyl acrylate esters include n-butyl acrylate, 2-ethyl hexyl acrylate, isooctyl acrylate, and the like, with 2-ethyl hexyl acrylate being preferred.

Modifying monomers may be present. They include one or more vinyl esters which may be present in a total amount of up to about 35 percent by weight, based on total weight of the monomers forming the acrylate polymer backbone. Representatives of the vinyl esters include vinyl acetate, vinyl butyrate, vinyl propionate, vinyl isobutyrate, vinyl valerate, vinyl versitate, and the like. Vinyl acetate is preferred.

Another modifying component of the acrylic backbone polymer is one or more diesters of a dicarboxylic acid and mixtures thereof, present in a total amount of up to about 35 percent by weight based on the total weight of the monomers. Each ester group of the diester of the dicarboxylic acid independently contains from about 8 to about 16, preferably from about 8 to about 12, carbon atoms. The preferred diesters are di-2-ethyl hexyl maleate, di-3-ethyl hexyl fumarate and mixtures thereof.

Another modifying component and preferably used monomer is one or more unsaturated carboxylic acids containing from 3 to about 5 carbon atoms and present in a total amount of up to about 10 percent by weight of the polymer, preferably from 5 to about 10 percent by weight. The unsaturated carboxylic acids includes, among others, acrylic acid, methacrylic acid, iraconic acid, beta carboxy ethyl acrylate and the like. Acrylic acid is presently preferred.

Other comonomers such as methyl acrylate, methyl methacrylate, styrene and the like could be used to modify the Tg of the acrylic copolymer. Polar comonomers such as N-vinyl pyrrolidone, N-vinyl caprolactam, hydroxyethyl(propyl) (meth)acrylate, acetoacetoxyethyl methacrylate, etc. could be used to further enhance adhesion to various surfaces. Other comonomers such as glycidyl methacrylate or allyl glycidyl ether could be used to further enhance high temperature shear properties.

The presently preferred acrylic backbone polymer is a copolymer of 2-ethyl hexyl acrylate present in an amount of from about 95 percent to about 90 percent by weight and acrylic acid present in an amount of from about 5 to about 10 percent by weight based on the weight of monomers forming the backbone.

The monomer proportions of the acrylic backbone polymer are adjusted in such a way that the graft copolymer is inherently tacky both prior to and after crosslinking and has a glass transition temperature of less than about −10° C., preferably from about −20° C. to about −60° C., giving a good balance of adhesion and tack at room temperature and low temperatures. The net crosslinked combination also has a Tg of at least 10° C. below use temperature. Normal use temperature is about 25° C.

The reactive pendant groups are provided in an amount of about 1 to about 15 percent by weight of the monomers forming the acrylic backbone and the pendant groups.

A wide variety of tackifiers, plasticizers and/or oils may be of use to modify adhesive properties of the continuous phase. Tackifiers raise glass transition temperature while plasticizers and oils lower glass transition temperature. They range from petroleum-based products, rosins, rosin esters, white oil, mineral oil and the like. As specific tackifiers employed in the practice of the invention, there may be mentioned: rosin esters such as Foral 85 and 105, terpene phenolics sold by Arizona chemical and the like.

The acrylic backbone modifiers are normally present in a concentration ranging from about 5 percent to about 40 percent by weight of the mixture of modifier and the acrylic phase.

In the following Examples and Controls the following test procedures were employed.

180° Peel

Samples of the adhesive either directly coated on mylar or laminated to mylar from the release liner were cut in 2.54 cm by about 20 cm test strips. They were rolled down on a stainless steel test panel with a 2 kg rubber clad steel roller moving back and forth at a rate of about 30 cm/min. After a dwell time of 20 minutes or 24 hours, the test strips were peeled away from the test panel in an Instron Tensile Tester at 180° to the test panel, i.e., folded back on itself and parallel to the surface of the panel, at a rate of about 30 cm/min. The force to remove the adhesive strip from the test panel was measured in Newtons per meter (N/m). Tests were performed in triplicate.

Shear

Samples of the adhesive coated on release liner were laminated to 2 mil soft aluminum facestock. A strip of tape was adhered by its adhesive to a stainless steel (SS) panel using a 2 kg rubber clad steel roller with a free end of the tape extending beyond the plate. The adhesive contact area being either 1.27 cm×1.27 cm or 1.27×2.54 cm or 2.54 cm×2.54 cm. After appropriate dwell time, i.e., zero dwell for initial room temperature (RT) shear and 24 hr dwell RT, followed by dwell for 30 minutes at 70° C. for 70° C. shear. The plate was placed at an angle of 2° from the vertical and a load is suspended from the free end. For initial and 24 hour RT shear, a 500 g or 1,000 g load was used, for 70° C. shear a 500 g load was used.

Percent Insolubles

This test determines the portion of the polymer that is insoluble in the solvent used to dissolve it. The test consists of weighing out a small amount of the adhesive, 75 mg., and placing it in a 5 micrometer polytetrafluoroethylene membrane filter. The edges of the filter was sealed to contain the sample and the filter was placed in a vial containing the solvent. The vial was tumbled for 48 hours, the filter taken out of the solvent, dried at elevated temperature under vacuum. The filter was weighed and the resulting weight of the sample was used to calculate the percent insoluble as follows:

% insoluble=final weight of the sample×100/initial weight of the sample

Without being limiting the following are to illustrate the invention:

EXAMPLE 1

To a solution of 3.2 g (8 pphm)[1] of Elvacite MM-1009, a polymethyl methacrylate/glycidyl methacrylate (GMA) theoretical mole % 85/15 macromonomer having a Mn=4510 Mw=11900 made by DuPont, there was added 35.6 g (89 pphm) of 2-ethylhexyl acrylate, 1.2 g (3 pphm) of acrylic acid and 0.015 g of Vazo 64 initiator (0.0375 pphm). The solution was introduced to a pressure bottle, purged with nitrogen for 10 minutes, capped and immersed in a bath maintained at 62° C. for 24 hours. After the reaction, additional ethyl acetate was added to dilute the graft copolymer. This formed polymer was used for testing pressure-sensitive adhesive properties.

[1]pphm=parts per hundred parts total monomers

EXAMPLE 2

To 10 grams of the graft copolymer prepared in Example 1 at 34.62% solids there was added 4.62 g of a 50% solution of Foral 105 tackifier in ethyl acetate. After mixing, the tackified polymer was coated on a release liner. The solvent was flashed off at room temperature for 10 minutes and dried at 70° C. for 10 minutes, then laminated to soft Aluminum for elevated temperature shear testing and to Mylar film for peel testing.

EXAMPLE 3

To 10 grams of the graft copolymer of Example 1 at 34.62% solids there was added 5.665 g of a 50% solids solution of Floral 105 in ethylacetate. After mixing the tackified polymer was coated onto a release liner, the solvent flashed off and after drying transferred to soft aluminum for elevated temperature shear and to Mylar for peel testing.

EXAMPLE 4

To same amount of polymer and tackifier solution as in Example 2 there was added 0.34 g (9 wt. %) of Anchor 1170 (modified $BF_3$.amine complex) crosslinker. After coating on a release liner the cast polymer was cured at 70° C. for 1 hour prior to lamination as in Example 2 for testing.

EXAMPLE 5

6.4 g (16 pphm) of Elvacite MM 1009 was dissolved in 40 g ethyl acetate. To this mixture there was added 33.6 g of 2-ethyl hexyl acrylate (2-EHA) (84 pphm) and 0.015 g of Vazo 64 initiator. This solution was purged with nitrogen for 10 minutes, capped and immersed in a bath maintained at 62° C. for 24 hours. This uncrosslinked graft copolymer was coated on to a release liner, flash dried then dried at 70° C. for 10 minutes for making the Rheometrics curve for which is polymer "C" in FIG. 2.

EXAMPLE 6

To 7.291 g of the dry polymer of Example 1 there was added ethyl acetate and 0.667 g of Anchor 1170 crosslinker. This was coated, flash dried and cured at 70° C. for 1 hour. The Rheometrics curve for the crosslinked polymer is "A" in FIG. 1 and 2.

EXAMPLE 7

To 40 g of the solution (35% solids) there was added 18.3 g of Floral 105 solution (50%) in ethyl acetate. The polymer to Foral 105 ratio was 60:40. To 11.44 g of this dry polymer there was added 1.04 g of Anchor 1170 crosslinker and was cured. The Rheometrics curve for the crosslinked polymer is "D" in FIG. 3.

CONTROL 1

A copolymer, the Rheometrics curve for which is marked "B" in FIG. 1, was synthesized using the same amounts and procedure as in Example 2 except that the macromonomer used was Elvacite MM-1001 from DuPont which had a Mn=3090, Mw=7810 and was a homo PMMA macromonomer. The copolymer was coated on release liner, flash dried for 10 minutes at room temperature and dried at 70° C. for 10 minutes and laminated as in Example 2 for making the Rheometrics sample.

CONTROL 2

To 40 g the polymer of Control 1 there was added 18.7 g of a solution of Foral 105 (50% solids) in ethyl acetate. The polymer to Foral 105 ratio was 60:40. The poured solution was coated on a release liner, flashed at room temperature for 10 minutes and dried at 70° C. for 10 minutes. The Rheometrics curve is "E" of FIG. 3.

EXAMPLE 8

Cyclohexane is a good solvent for the EHA/AA acrylic polymer but the PMMA/GMA macromonomer is insoluble in it. Thus, the graft copolymer containing PMMA domains that are associated will not dissolve in the cyclohexane solvent. Only the EHA/AA copolymer not containing any PMMA/GMA macromonomer grated onto it or the EHA/AA containing PMMA/GMA macromonomer which has not associated in the domain will get dissolved. The percent insoluble portion in cyclohexane thus gives an indication of the percent total polymer that has formed an associated network.

Tetrahydrofuran (THF) is a good solvent for all the components including PMMA/GMA macromonomer. Thus, insolubility in THF indicates that the network is crosslinked. If all the domains are crosslinked through the GMA-epoxy reaction, the percent insoluble in cyclohexane should be close to percent insoluble in THF.

The copolymer of Example 1 containing 8% Elvacite MM 1009–2512, 3% acrylic acid and the rest being EHA was dried at 70° C. for 10 minutes and subjected to leaching using cyclohexane as the solvent as described in the Percent Insolubles Test. This gave a number of 79.3% indicating that at least this percent of the total polymer had at least one PMMA/GMA grafted onto it and had formed an associated network.

To the polymer of Example 1 was added 3% of Anchor 1170 and this was subjected to curing for 15 minutes at 70° C. This was subjected to leaching with THF as the solvent. The percent insoluble fraction was 82.2% indicating that all the domains had essentially crosslinked.

CONTROL 3

As a control, a solution of 3.2 g (8 pphm) of a polystyrene macromonomer (GSC-349, Sartomer) in 60 g of ethyl acetate was prepared. To this was added 35.6 g of 2-EHA (89 pphm), 1.2 g of acrylic acid (3 pphm) and 0.03 g of Vazo 64. The same procedure used in the previous examples was employed for polymerization and testing. The results are shown in Table 1.

Shear was measured using a 2 ml. soft aluminum facestock. Peel was measured using 1.5 ml. mylar. RT shear was measured with no dwell on stainless steel. 70° C. shear was measured after 24 hours dwell on a stainless steel panel and 70° C. equilibrium for 30 minutes before testing. The shear data supports the belief that the acrylic backbone is the continuous phase and the macromonomer is the discontinous phase.

TABLE 2

| Example/ Control | % Acrylic Acid | % Foral 105 | % Anchor 1170 | 180° Peel, N/M | % Acid | RT Shear ½" × ½" 1 KG, Min. | 70° C. Shear ½" × 1", 500 G, Min. |
| --- | --- | --- | --- | --- | --- | --- | --- |
| Control 4 | 3 | 40 | 0 | 638, P | 3 | 1222, C | 17.3, C |
| Control 5 | 3 | 40 | 0.3 | 714, P | 3 | 376, C | 5.7, C |
| EX 9 | 3 | 40 | 0 | 727, P | 3 | 713, C | 11000+ |
| EX 10 | 3 | 40 | 0.3 | 717, P | 3 | 1840, P | 11000+ |

What is claimed is:

1. An inherently tacky pressure-sensitive adhesive graft copolymer comprising an acrylic backbone forming a continuous phase and comprised of at least one interpolymerized alkyl acrylate ester containing from about 4 to about 8 carbon atoms in the alkyl group and having pendant therefrom side chains formed from a crosslinkable macromonomer having a copolymerizable vinyl end group forming a discontinuous phase each of said side chains having a molecular weight of from about 1,000 to about 25,000, a glass transition temperature of greater than about 25° C. and containing at least one crosslinkable moiety selected from the group consisting of epoxy and carboxyl.

2. A graft copolymer as claimed in claim 1 in which the acrylic graft copolymer has a glass transition temperature of from about –20° to about –60° C.

3. A graft copolymer as claimed in claim 2 in which the acrylic backbone comprises from about 95 to about 90 percent by weight 2-ethylhexyl acrylate and from about 5 to about 10 percent by weight acrylic acid.

4. A graft copolymer as claimed in claim 2 in which the side chains are present in an amount of from 1 to about 15 percent by weight of the graft copolymer.

5. A graft copolymer as claimed in claim 4 in which there

TABLE 1

| Example/ Control | Macromonomer Type | Tackifier | X-Linked | % Macromonomer | % Acid | 180 Peel° N/M | 70° C. Shear ½" × 1", 1 KG, Min. |
| --- | --- | --- | --- | --- | --- | --- | --- |
| EX 2 | PMMA/GMA | 40% F-105 | No | 8 | 3 | 767 | Not tested |
| EX 3 | PMMA/GMA | 46% F-105 | No | 8 | 3 | 847 | 35, C |
| EX 4 | PMMA/GMA | 40% F-105 | Yes | 8 | 3 | 780 | 1775, P |
| Control 3 | Polystyrene | 40% F-105 | No | 8 | 3 | 850 | 50, C |

C = cohesive failure    P = panel failure

Examples 2, 3 and 4 show the adhesive properties before and after cure as against the adhesive property of a non-crosslinkable polystyrene macromonomer copolymer.

EXAMPLES 9 AND 10 AND CONTROLS 4 AND 5

Table 2 compares 180° peel and room temperature (RT) shear using a PMMA/GMA macr/omonomer (Examples 9 and 10) and PMMA macromonomer (Controls 4 and 5).

is present an acrylic backbone modifier selected from the group consisting of tackifiers, plasticizers, oils and mixtures thereof.

6. A graft copolymer as claimed in claim 4 in which the modifier is present in an amount of from about 5 percent to about 40 percent by weight based on the weight of the acrylic backbone and the modifier.

7. A graft copolymer as claimed in claim 2 in which there is present an acrylic backbone modifier selected from the group consisting of tackifiers, plasticizers, oils and mixtures thereof.

8. A graft copolymer as claimed in claim 1 in which the acrylic backbone comprises from about 95 to about 90 percent by weight 2-ethylhexyl acrylate and from about 5 to about 10 percent by weight acrylic acid.

9. A graft copolymer as claimed in claim 1 in which the side chains are present in an amount of from 1 to about 15 percent by weight of the graft copolymer.

10. A graft copolymer as claimed in claim 1 in which there is present an acrylic polymer modifier selected from the group consisting of tackifiers, plasticizers, oils and mixtures thereof.

11. A graft copolymer as claimed in claim 10 in which the modifier is present in an amount of from about 5 percent to about 40 percent by weight based on the weight of the acrylic backbone and the modifier.

12. A graft copolymer as claimed in claim 11 in which the acrylic polymer has a glass transition temperature of from about −20° to about −60° C.

13. A graft copolymer as claimed in claim 10 in which the macromonomer is present in an amount of from 1 to about 15 percent by weight of the acrylic monomer system and macromonomer.

14. A pressure-sensitive adhesive as claimed in claim 1 in which the macromonomer is selected from the group consisting of copolymers formed by reacting an alkyl methacrylate with a comonomer having a reactive group selected from the group consisting of carboxyl and epoxy and epoxidized copolymers of styrene-butadiene or styrene-isoprene and providing a terminal vinyl group.

15. A pressure-sensitive adhesive graft copolymer as claimed in claim 14 in which the alkyl methacrylate is methyl methacrylate.

16. A graft copolymer as claimed in claim 15 in which the acrylic polymer has a glass transition temperature of from about −20° to about −60° C.

17. A graft copolymer as claimed in claim 16 in which the macromonomer is present in an amount of from to about 15 percent by weight of the acrylic monomer system and macromonomer.

18. A graft copolymer as claimed in claim 17 in which the macromonomer is a copolymer of methyl methacrylate and glycidyl methacrylate.

19. A graft copolymer as claimed in claim 17 in which there is present an acrylic backbone selected from the group consisting of tackifiers, plasticizers, oils and mixtures thereof.

20. A graft copolymer as claimed in claim 15 in which the acrylic backbone comprises from about 95 to about 90 percent by weight 2-ethylhexyl acrylate and from about 5 to about 10 percent by weight acrylic acid.

21. A graft copolymer as claimed in claim 15 in which the macromonomer is present in an amount of from 1 to about 15 percent by weight of the acrylic monomer system and macromonomer.

22. A graft copolymer as claimed in claim 15 in which the macromonomer is a copolymer of methyl methacrylate and glycidyl methacrylate.

23. A graft copolymer as claimed in claim 14 in which the acrylic polymer has a glass transition temperature of from about −20° to about −60° C.

24. A graft copolymer as claimed in claim 14 in which the acrylic backbone system comprises from about 95 to about 90 percent by weight 2-ethylhexyl acrylate and from about 5 to about 10 percent by weight acrylic acid.

25. A graft copolymer as claimed in claim 14 in which the acrylic backbone comprises from about 95 to about 90 percent by weight 2-ethylhexyl acrylate and from about 5 to about 10 percent by weight acrylic acid.

26. A graft copolymer as claimed in claim 14 in which the macromonomer is present in an amount of from 1 to about 15 percent by weight of the acrylic monomer system and macromonomer.

27. A graft copolymer as claimed in claim 14 in which the macromonomer is a copolymer of methyl methacrylate and glycidyl methacrylate.

28. A graft copolymer as claimed in claim 27 in which there is present an acrylic backbone modifier selected from the group consisting of tackifiers, plasticizers, oils and mixtures thereof.

29. A graft copolymer as claimed in claim 14 in which there is present an acrylic backbone modifier selected from the group consisting of tackifiers, plasticizers, oils and mixtures thereof.

30. A graft copolymer as claimed in claim 14 in which the acrylic backbone modifier is present in an amount of from about 5 percent to about 40 percent by weight based on the weight of the acrylic phase and the macromonomer.

31. An inherently tacky pressure-sensitive adhesive crosslinked graft copolymer comprising an acrylic backbone comprised of at least one interpolymerized alkyl acrylate ester containing from about 4 to about 8 carbon atoms in the alkyl group and having pendant therefrom crosslinked macromonomer side chains provided by macromonomer having a copolymerizable vinyl end group and at least one crosslinkable moiety selected from the group consisting of epoxy and carboxyl, each of said side chains, prior to crosslinking, having a molecular weight of from about 1,000 to about 25,000, and a glass transition temperature of greater than about 25° C.

32. A crosslinked graft copolymer as claimed in claim 31 in which the acrylic graft copolymer has a glass transition temperature of from about −20° to about −60° C.

33. A crosslinked graft copolymer as claimed in claim 31 in which the acrylic backbone comprises from about 95 to about 90 percent by weight 2-ethylhexyl acrylate and from about 5 to about 10 percent by weight acrylic acid.

34. A crosslinked graft copolymer as claimed in claim 31 in which the crosslinked side chains are present in an amount of from 1 to about 15 percent by weight of the graft copolymer.

35. A crosslinked graft copolymer as claimed in claim 31 in which there is present an acrylic polymer modifier selected from the group consisting of tackifiers, plasticizers, oils and mixtures thereof.

36. A crosslinked pressure-sensitive adhesive as claimed in claim 31 in which the macromonomer is selected from the group consisting of copolymers formed by reacting an alkyl methacrylate with a comonomer having a reactive group selected from the group consisting of amino, hydroxyl, carboxyl and epoxy and epoxidized copolymers of styrene-butadiene or styrene-isoprene and providing a terminal vinyl group.

37. A pressure-sensitive adhesive graft copolymer as claimed in claim 36 in which the alkyl methacrylate is methyl methacrylate.

* * * * *

UNITED STATES PATENT AND TRADEMARK OFFICE
CERTIFICATE OF CORRECTION

PATENT NO. : 5,578,683
DATED : November 26, 1996
INVENTOR(S) : Carol A. Koch; Prakash Mallya; Colin C. Smith It is certified that error appears in the above-indentified patent and that said Letters Patent is hereby corrected as shown below:

Column 3, line 29, after "only" change "a" to -- an --.
Column 3, line 46, change "macronomers" to -- macromonomers --.
Column 4, line 11, after "with" change "a" to -- an --.
Column 4, line 51, change "Pacific Anchor corporation" to
    -- Pacific Anchor Corporation --.
Column 5, lines 17,18, change "copolymers" to -- copolymer --.
Column 6, line 16, change "iraconic" to -- itaconic --.
Column 6, line 54, change "Arizona chemical" to
    -- Arizona Chemical --.
Column 7, line 27, change "edges" to -- edge --.
Column 8, line 1, change "Floral" to -- foral --.
Column 8, line 7, after "to" and before "same" insert -- the --.
Column 8, line 22, after "curve" delete "for".
Column 8, line 35, change "Floral" to -- foral --.
Column 9, line 2, replace "has" with -- was --.
Column 9, line 55, in TABLE 1 after "EX 3  PMMA/GMA" change
    "46% F-105" to -- 45% F-105 --.
Column 9, line 66, change "macr/omonomer" to -- macromonomer --.

UNITED STATES PATENT AND TRADEMARK OFFICE
CERTIFICATE OF CORRECTION

PATENT NO. : 5,578,683
DATED : November 26, 1996
INVENTOR(S) : Carol A. Koch; Prakash Mallya; Colin C. Smith It is certified that error appears in the above-indentified patent and that said Letters Patent is hereby corrected as shown below:

Column 11, line 39, replace "from to about 15" with
-- from 1 to about 15 --.
Column 11, line 64, after "backbone" delete "system".

Signed and Sealed this

Twenty-sixth Day of August, 1997

*Attest:*

BRUCE LEHMAN

*Attesting Officer*       *Commissioner of Patents and Trademarks*